United States Patent
Thornton et al.

(10) Patent No.: US 7,069,453 B1
(45) Date of Patent: Jun. 27, 2006

(54) PAPER DOCUMENT SATCHELS

(75) Inventors: James D. Thornton, Mountain View, CA (US); Anthony G. LaMarca, Redwood City, CA (US)

(73) Assignee: Xerox Corporation, Stamford, CT (US)

( * ) Notice: Subject to any disclaimer, the term of this patent is extended or adjusted under 35 U.S.C. 154(b) by 213 days.

(21) Appl. No.: 08/976,579

(22) Filed: Nov. 24, 1997

(51) Int. Cl.
*G06F 17/00* (2006.01)

(52) U.S. Cl. .................. 713/202; 382/181; 382/173

(58) Field of Classification Search .............. 380/25, 380/246, 51, 55, 54; 713/179, 200–202; 235/375, 435–495; 902/2, 4; 283/70, 74, 283/81; 305/276; 362/305; 707/100–102; 382/173–190

See application file for complete search history.

(56) References Cited

U.S. PATENT DOCUMENTS

| | | | | |
|---|---|---|---|---|
| 3,780,270 A | * | 12/1973 | Faulkner et al. | 235/462 |
| 4,811,111 A | * | 3/1989 | Kurokawa | 358/440 |
| 5,181,162 A | * | 1/1993 | Smith et al. | 364/419 |
| 5,221,833 A | * | 6/1993 | Hecht | 235/494 |
| 5,331,547 A | * | 7/1994 | Laszlo | 705/ |
| 5,414,251 A | * | 5/1995 | Durbin | 435/462.2 |
| 5,486,686 A | * | 1/1996 | Zdybel et al. | 235/375 |
| 5,572,010 A | * | 11/1996 | Petrie | 235/494 |
| 5,577,177 A | * | 11/1996 | Collins et al. | 345/469 |
| 5,640,193 A | * | 6/1997 | Wellner | 725/100 |
| 5,671,282 A | * | 9/1997 | Wolff et al. | 380/25 |
| 5,708,825 A | * | 1/1998 | Sotomayor | 707/501 |
| 5,719,595 A | * | 2/1998 | Hoddie et al. | 345/136 |
| 5,862,321 A | * | 1/1999 | Lamming et al. | 709/200 |
| 5,905,246 A | * | 5/1999 | Fajkowski | 235/375 |
| 5,930,476 A | * | 7/1999 | Yamunachari | 709/224 |
| 6,003,773 A | * | 12/1999 | Durbin et al. | 235/462.45 |

OTHER PUBLICATIONS

A fuzzy based handwriting extraction technique for handwritten document preprocessing Yan Solihin; Leedham, C.G.; Sagar, V.K.; TENCON '96. Proceedings. 1996 IEEE TENCON. Digital Signal Processing Applications, vol. 2, Nov. 26-29, 1996.*

Umark: the figure code system enables interactive mutual conversion between ATOM and BIT Usuda, H.; Idesawa, M.; Systems, Man, and Cybernetics, 1999. IEEE SMC '99 Conference Proceedings. 1999 IEEE International Conference on.*

Computer-based techniques for the optimal extraction of medical data from graphical paper records Bhullar, H.K.; Fothergill, J.C.; de Bono, D.P.; Medical Imaging: Image Processing and Analysis, IEE Colloquium on , Mar. 3, 1992.*

* cited by examiner

*Primary Examiner*—David Jung
(74) *Attorney, Agent, or Firm*—Oliff & Berridge, PLC

(57) ABSTRACT

A paper document satchel is an ordinary piece of paper that functions as a fully functional document token repository by virtue of the data encoded in printed marks on the page. The paper document satchel provides a portable and functional way to transfer document, reference, owner, etc., information between computer systems.

27 Claims, 4 Drawing Sheets

PAPER DOCUMENT SATCHELS

BACKGROUND OF THE INVENTION

1. Field of Invention

The invention relates to a method and system for using paper document satchels. In particular, the invention is directed to encoding areas of a paper document so that those areas may be scanned into a processing system in order to access additional documents, information, etc.

2. Description of Related Art

Modern electronic document processing systems generally include input scanners for electronically capturing the general appearance of the document, general purpose computers for enabling users to create, edit and otherwise manipulate electronic documents, and printers for producing hard copy, human-readable versions of electronic documents. These systems typically have convenient access to mass memory for storage and retrieval of electronic document files. Moreover, they often are networked by local area networks (LANs), switched data links, and the like for facilitating the interchange of digital electronic documents and for providing multi-user access to shared system resources, such as high-speed electronic printers and electronic file servers.

U.S. Pat. No. 5,486,686 to Zdybel, Jr. et al., issued Jan. 23, 1996, which is incorporated herein by reference in its entirety, discusses the transfer of electronic documents between electronic document processing systems. Electronic documents can be transferred in the form of what may be termed as document satchels. Document satchels may be, for example, small low-power, interactive devices such as pagers or cellular phones for easily exchanging electronic documents or for requesting common operations, such as printing. Document satchels can take many forms with different attributes. Document satchels are characterized by their portability, facility for carrying a set of document tokens, facility for carrying identity information about the owner, and facility for communicating with the infrastructure in other document satchels to perform abstract operations on tokens in a streamlined way.

Apart from the portability, each of these features requires some explanation. Satchels are fundamentally devices for trafficking in tokens. A token has two parts, the reference and the access information. Basically, a token is a pointer to a document, not a copy of a document. Since it is a pointer, a token is relatively small in size and multiple tokens can be stored in a small space, such as the memory available in a simple device.

In addition, a token is more than a simple reference because it includes access information. The access information part of a token can accommodate a number of different types of data. Security data is a prime example. Other possibilities include indications of pricing, legal restrictions, or ratings.

Moreover, access information might be useful to help a user deal with a document, such as a record of where the document is stored in the holder's hierarchy, or a human-readable string identifying the document. Most, if not all, of these supplementary types of data would be optional and unused for some documents. In general, however, the access information part of tokens would make them awkward to transfer by hand copying, dictation or similar methods. A facility for electronic transfer of these document references would be truly valuable.

Associated with each satchel is information which identifies the owner. That information is used to add context to the record of a token transfer. The recipient of a token can later find it by the identity of the person who furnished it, or by the location in which the transfer took place, if location information was available. Different items could be included in the identity information, such as the owner's name, e-mail address, telephone number and public key for signing secure messages.

The ability to communicate makes a satchel useful. In order to serve mobile workers well, satchel designers have selected certain common document operations which would be very simple to perform. Central to all of these operations is the transfer of tokens.

The user interface for this operation would be very simple because the physical and communication contexts narrow the range of possible actions. Other operations, such as printing or faxing a copy of a document, can be handled in a very similar way from the user's point of view. However, there are important pieces of infrastructure which operate behind the scenes to make the user-level simplicity possible. For example, when a token is transferred with a user's identity to a printer for printing the document, the satchel print service may need to take a number of steps to complete the operation. Initially, the document itself must be obtained, which may require authentication and/or electronic payment. If a printable version of the document is not available from the original repository, a conversion service must be invoked to produce a version suitable for the target printer. Finally, the job must be submitted for printing using whatever mechanisms are appropriate, including handling of authentication and billing, if required.

Conventionally, as shown in FIG. 1, tokens are generated by a token generator 110 located in a first CPU 105. These document tokens can be transferred to a second CPU 145 over a distributed network through the network interfaces 135 and 140.

Alternatively, the document tokens can be transferred to a first information bus 115, where they may be stored in a first memory 120, on a first hard disk 125 or sent to a first floppy disk drive 130 for storage on a floppy disk 170.

The floppy disk 170 can then be input into a second computer system through a second floppy disk drive 155. The tokens input from the floppy disk 170 can then be sent through a second information bus 150 to the second CPU 145 of the second computer system, or they may be stored on a second hard disk 160 or in a second memory 165.

Thus, by transferring the tokens electronically, copying and carrying paper documents can be avoided because references to electronic versions of paper documents can be conveniently handled instead.

However, paper documents are still a primary medium for written communications and for record keeping. Paper documents can be easily replicated by photocopying, they can be distributed and filed in original or photocopied form, and facsimiles of paper documents can be transmitted to remote locations over the public switched telephone network. Paper and other hard copy documents are so pervasive that they are not only a common output product of electronic document processing systems, but also are an important source of input data to such systems.

SUMMARY OF THE INVENTION

Paper document satchels are traditional printed documents that have been augmented to function as digital devices by encoding on the paper software objects with well-defined, general semantics. Paper document satchels enable electronic documents to be transported by paper. The encoded software objects communicate completed documents, or references to documents, to document services.

These and other features and advantages of this invention are described in or are apparent from the following detailed description of the preferred embodiments.

BRIEF DESCRIPTION OF THE DRAWINGS

The invention is described in detail with reference to the following drawings, wherein like numerals represent like elements and wherein.

DETAILED DESCRIPTION OF PREFERRED EMBODIMENTS

A paper document satchel is an ordinary piece of paper that functions as a satchel by virtue of the data encoded in the printed marks placed on the page. For convenience in streamlining operations, the data must be machine readable. There are several technologies that could be used to satisfy this requirement, including optical character recognition (OCR) and traditional bar codes.

By embedding data within a printed document, using, for example, DataGlyphs, the paper itself can become a fully functional document satchel.

Embedding tokens in paper documents makes it easier to follow references, obtain additional copies, forward copies, and keep copies without carrying the physical paper from wherever it was encountered.

Figure 1:
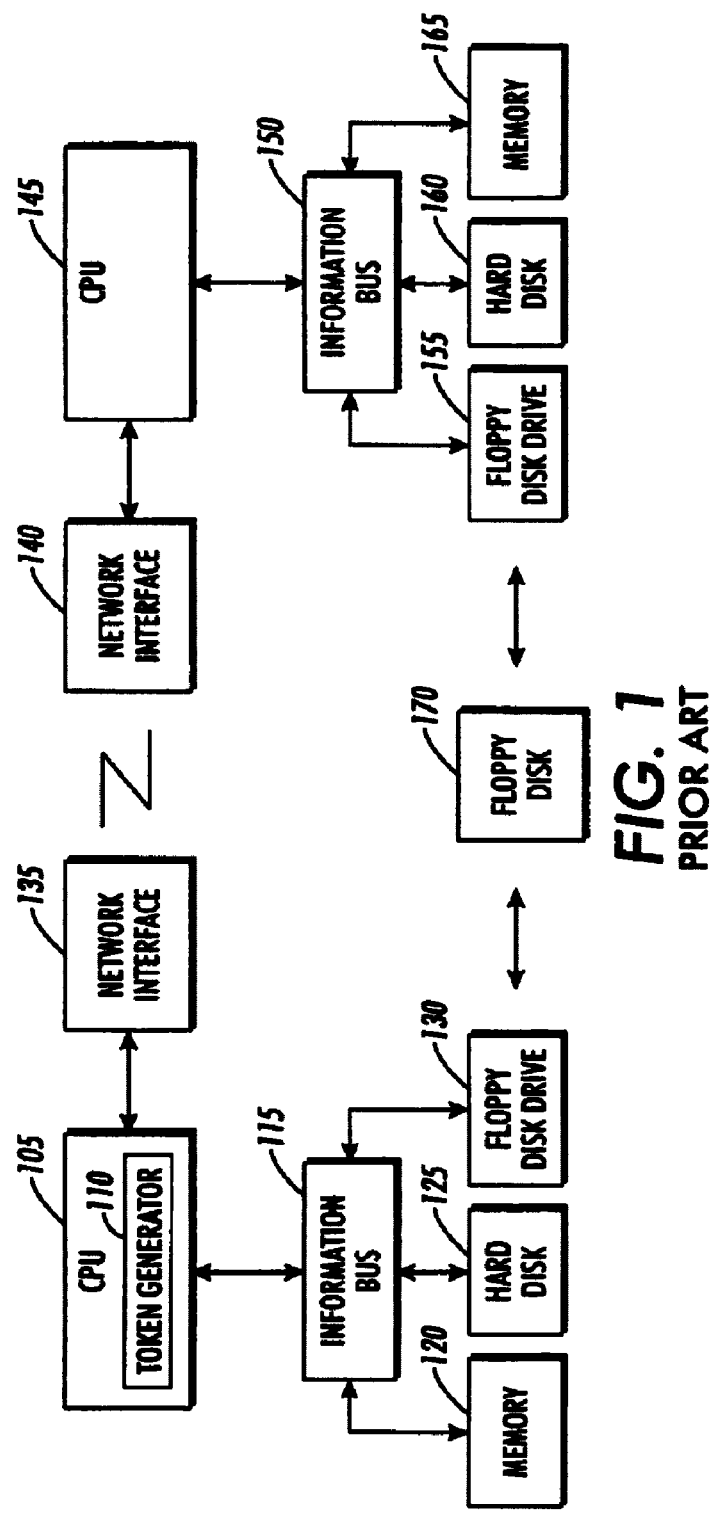
FIG. 1 is a diagram illustrating how electronic documents are conventionally transferred between computer systems.
Figure 2:
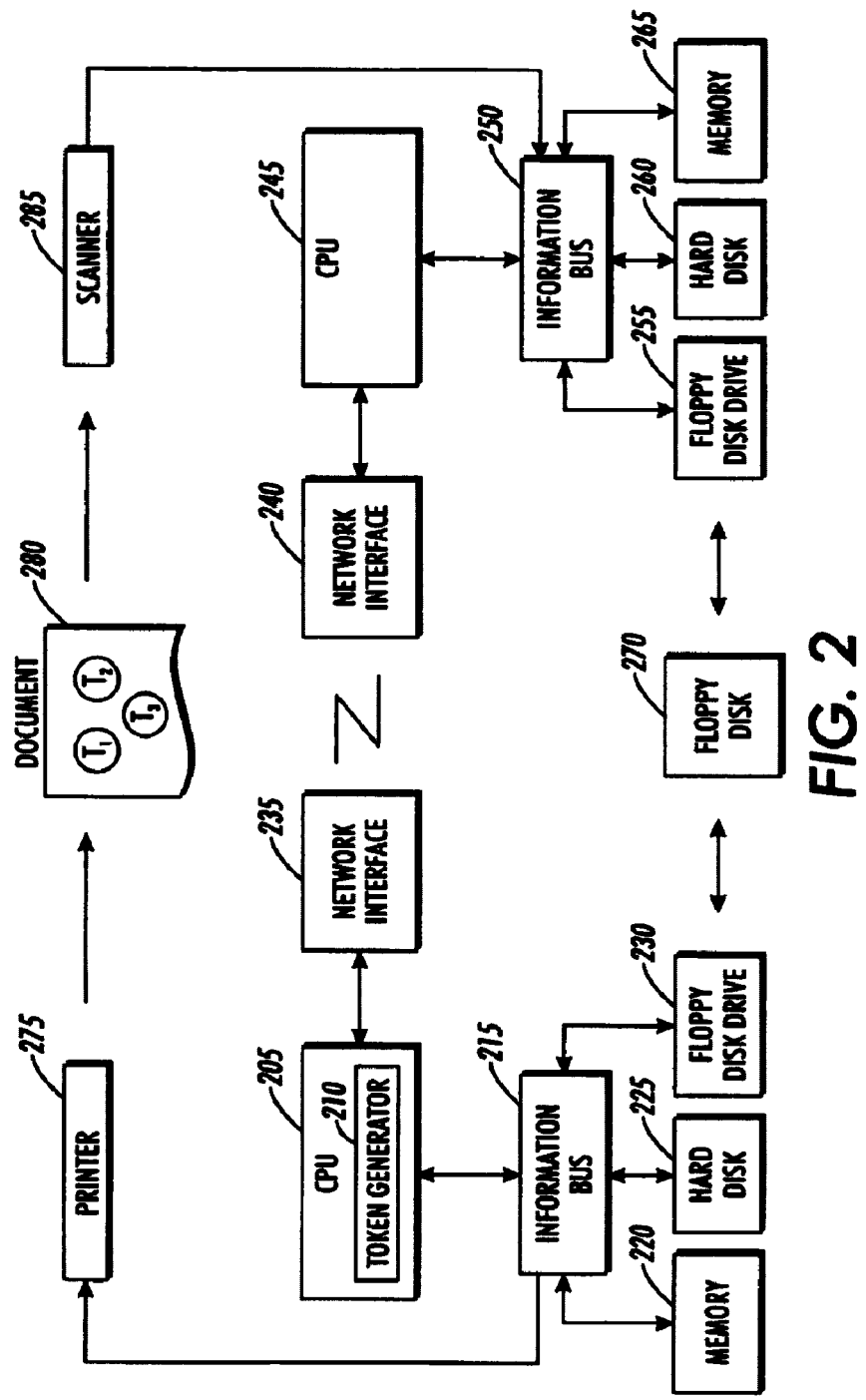
FIG. 2 is a diagram illustrating how document tokens are transferred between computer systems using paper document satchels.

For example, as shown in FIG. 2, paper document satchels modify the transfer of tokens between computer systems shown in FIG. 1. The token generator 210 of the first CPU 205 can still send the electronic tokens to the second CPU 245 of the second computer system via the network interfaces 235 and 240. However, the first CPU 205 can also print these document tokens onto a paper document 280 via a printer 275. The paper document 280 can then be carried to any computer system capable of reading the tokens carried on the paper document 280.

To access the information represented by the tokens, the paper document 280 is scanned by a scanner 285. The scanner 285 inputs the tokens to the second information bus 250. One or more tokens may be scanned at a time. The tokens can then be stored on the second hard disk 260, the second memory 265, on the floppy disk 270 by the second floppy disk drive 255 or sent directly to the second CPU 245 for processing. The second CPU 245 can then access the information represented by the tokens.

Every satchel has a facility for communication. Every satchel has the ability to communicate the information it holds by being scanned. Tokens can be read with either wand scanners or bed scanners connected to either the infrastructure or to other satchels. The user receives a document token from a paper document satchel by swiping the scanner window over one or more DataGlyph regions (or any areas with encoded information) on the paper document. To print a copy of a document using a paper document satchel, the user places the page on the glass of a satchel-enabled multi-function device, selects the desired document on a simple user interface, and presses the single action button. It should be appreciated that these examples have people performing abstract operations in a simple, streamlined fashion, just as they would do with electronic satchels.

Figure 3:
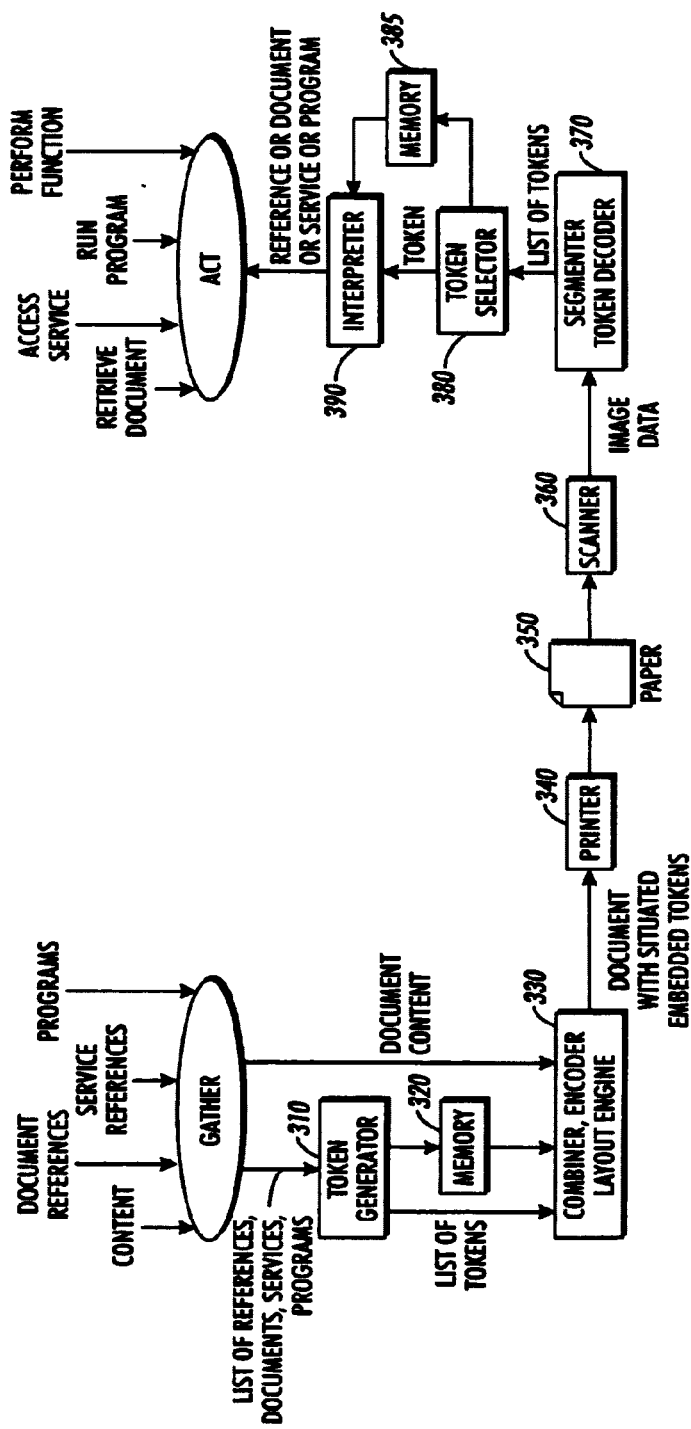
FIG. 3 is a diagram of the flow of tokens between computer systems.

FIG. 3 shows a more detailed view of the system shown in FIG. 2. A list of references, documents, services, programs and the like are gathered and input to a token generator 310. At the same time, the document content of the references, the documents, the services, the programs and the like is sent to a combiner/encoder layout engine 330. The tokens generated by the token generator 310 can be sent directly to the combiner/encoder layout engine 330 or can be temporarily stored in a memory 320 before being sent to the combiner/encoder layout engine 330. Once the document content and the tokens are paired in the combiner/encoder layout engine 330, documents with embedded tokens can be printed by the printer 340 and placed onto sheets of paper 350.

To read the embedded tokens, the paper is scanned by a scanner 360. The image data is then sent to a segmenter/token decoder 370. The segmenter/token decoder 370 takes the image data, finds and identifies the tokens, decodes the tokens, and generates a list of the tokens. The list of the tokens is sent to a token selector 380, which allows the user to choose which tokens to access. Once one or more tokens are selected, they can be stored in a memory 385 or sent to an interpreter 390.

The interpreter 390 can take several forms. For example, the interpreter 390 can be a pay phone, which reads tokens printed on a calling card. In addition, the interpreter 390 can be a security card reader, authentication device or any other device which needs to interpret information in regard to a specific user, a specific document, or the like. The interpreter 390 can then perform a function, run a program, access a service, retrieve a document, or perform whatever function the user of the token has available, based on the contents of the token.

As shown in FIG. 3, generating and encoding the tokens for use in paper document satchels is preferably implemented on a programmed general purpose computer. However, generating and encoding the tokens can also be implemented on a special purpose computer, a programmed microprocessor or microcontroller and peripheral integrated circuit elements, an ASIC or other integrated circuit, a hardwired electronic or logic circuit such as a discrete element circuit, a programmable logic device such as a PLD, PLA, FGPA or PAL, or the like. In general, any device on which a finite state machine capable of implementing the functions shown in FIG. 3 can be used to generate and encode the tokens.

Figure 4A:
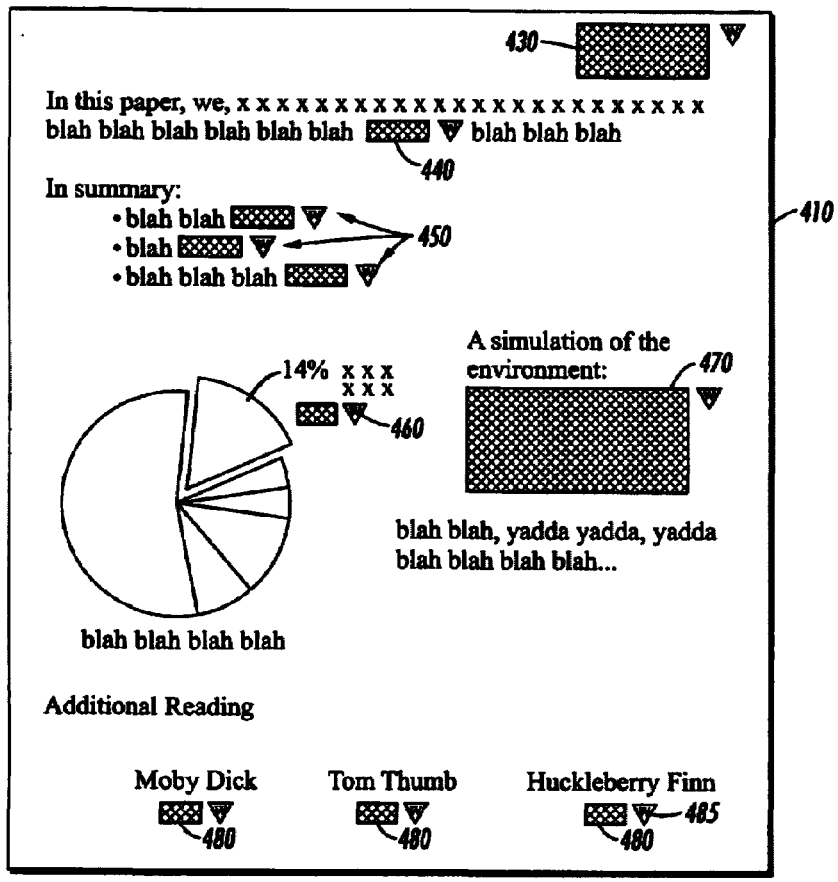
FIGS. 4A and 4B show examples of paper document satchels.
Figure 4B:
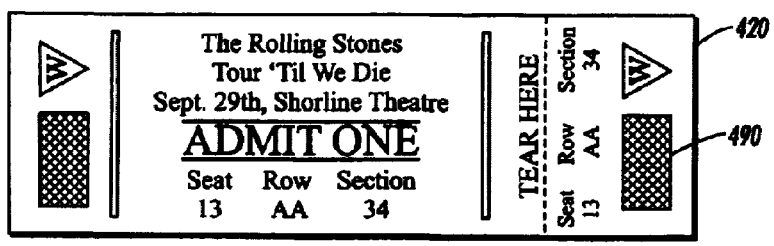

FIGS. 4A and 4B show two examples of paper document satchels. FIG. 4A shows a document which can be taken to a business meeting and contains author information, data information and additional reference information which may be accessed by the document recipient. For example, the encoded area 430 could be the document author's information, which could include name, address, phone number, date, and resume information, etc. The encoded areas 440 and 450 may hold tokens for accessing additional documents that may provide reference information (i.e., documents that are normally footnoted), for example. Encoded area 460 may provide information for accessing the data set used to generate the chart, for example. The encoded area 470 may include tokens that when scanned, provide a simulation of the environment described in the document, for example.

The encoded areas 480 provide access to additional reading on the subject matter of the document, for example.

The encoded areas on the document may also be accompanied with a human readable identifier 485, such as an icon, descriptive text, a logo, etc. The human readable identifier 485 will enable the document user to quickly identify whether the encoded information may be useful for a particular purpose, such as background information, reference information, supporting data, etc. For example, human readable identifiers 485 for references may include a portion of a title, the word "reference", a picture of a book, the letter "R", etc.

FIG. 4B shows how paper satchels may be used as security measures. For example, tokens could be embedded in the encoded area 490 on concert, sporting event, or airline tickets. The tokens could include authentication information, such as names, photos, passwords, etc. which may be encoded in such a manner that they cannot be adequately reproduced by reproduction machines, such as a copier. In this manner, the tokens can be read by a scanner and authenticated on the spot by officials at an arena, stadium, or airport, for example. Thus, the use of counterfeit tickets or unauthorized access to certain areas, can be reduced or eliminated.

Every satchel is a carrier of a set of document tokens. A paper document satchel is no exception. On paper, the tokens are encoded in DataGlyph regions such as the ones shown in FIGS. 4A and 4B. The data carrying the error correction properties of DataGlyph technologies should permit complete tokens to be stored in reasonable space, particularly with compression. Document pointers, such as URLs, can be recorded in text in paper documents, but as the amount of data increases or the form becomes more arbitrary, text encoding becomes less appealing and harder to use. With DataGlyphs, arbitrary binary data can be encoded in a moderately appealing way, and can be easily used with the right infrastructure.

Satchels can also carry identity information about the owner. In a paper document satchel, identity information can also be encoded using DataGlyphs. The choice of what to store will be different for every user. However, all the common identity elements mentioned earlier can be accommodated. This data can be used to record context for operations involving the paper, as is done with electronic satchel communications.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A system for producing and processing a paper document, comprising:
    a token generator that generates user-selectable tokens relating to at least one other document, the other document being an electronic document, for purposes of linking the other document;
    an encoder that encodes the generated tokens;
    a printer that prints the encoded tokens onto the paper document; and
    a selector that allows a user to select one or more decoded tokens from a list of decoded tokens.

2. The system of claim 1, further comprising an electronic scanner that reads the encoded tokens.

3. The system of claim 2, further comprising a processor that recognizes the scanned tokens.

4. The system of claim 3, wherein the processor retrieves an electronic document based on the recognized tokens.

5. The system of claim 1, wherein the printer prints human-readable identifiers relating to the tokens printed on the paper document.

6. The system of claim 1, wherein the encoder encodes information relating to the owner of the document.

7. The system of claim 1, wherein the encoder encrypts the encoded tokens.

8. The system of claim 1, wherein the token generator generates tokens containing authentication information.

9. A system for producing and processing a paper document, comprising:
    token generating means for generating user-selectable tokens relating to at least one other document, the other document being an electronic document, for purposes of linking the other document;
    encoding means for encoding the generated tokens;
    printer means for printing the encoded tokens onto the paper document; and
    a selector means for selecting from a list of decoded tokens one or more of the user-selectable tokens that have been decoded.

10. The system of claim 9, further comprising an electronic scanning means for reading the encoded tokens.

11. The system of claim 10, further comprising a processing means that recognizes the scanned tokens.

12. The system of claim 11, wherein the processing means retrieves an electronic document based on the recognized tokens.

13. The system of claim 9, wherein the printer means prints human-readable identifiers relating to the tokens printed on the paper document.

14. The system of claim 9, further comprising storage means for storing generated tokens.

15. The system of claim 9, wherein the encoding means encodes information relating to the owner of the document.

16. The system of claim 9, wherein the encoding means encrypts the encoded tokens.

17. The system of claim 9, wherein the generating means generates tokens containing authentication information.

18. A method for producing and processing a paper document, comprising:
    generating user selectable tokens relating to at least one other document, the other document being an electronic document, for purposes of linking the other document;
    encoding the generated tokens;
    printing the encoded tokens onto the paper document; and
    selecting one or more of the user-selectable tokens that have been decoded from a list of decoded tokens.

19. The method of claim 18, further comprising electronically scanning the encoded tokens.

20. The method of claim 19, further comprising recognizing the scanned tokens.

21. The method of claim 20, further comprising retrieving an electronic document based on the recognized tokens.

22. The method of claim 18, wherein the printing includes printing human-readable identifiers relating to the tokens printed on the paper document.

23. The method of claim 18, further comprising storing the generated tokens.

24. The method of claim 18, wherein encoding includes encoding information relating to the owner of the documents.

25. The method of claim 18, further comprising encrypting the encoded tokens.

26. The method of claim 18, wherein the generating includes generating tokens that contain authentication information.

27. A system for processing a paper document, comprising:
- a scanner that reads embedded tokens in the paper document;
- a segment token decoder that receives image data from the scanner and identifies and decodes the tokens in order to generate a list of decoded tokens; and
- a token selector that allows a user to select which decoded tokens to access from the list of decoded tokens.

* * * * *